United States Patent [19]
Chen

[11] Patent Number: 5,824,126
[45] Date of Patent: Oct. 20, 1998

[54] SOOT FILTERING CAP IN A RANGE HOOD

[76] Inventor: Cheng Ho Chen, No. 38, Lane 359, Sec. 1, Fu-Chien Rd., Tainan, Taiwan

[21] Appl. No.: 861,124

[22] Filed: May 21, 1997

[30] Foreign Application Priority Data

Oct. 24, 1996 [TW] Taiwan ................................. 85216809

[51] Int. Cl.⁶ .................................................. B01D 46/10
[52] U.S. Cl. ................................ 55/501; 55/504; 55/508; 55/511; 55/DIG. 6; 55/DIG. 31; 55/DIG. 36
[58] Field of Search ............................. 55/494, 501, 504, 55/508, 511, DIG. 6, DIG. 31, DIG. 36

[56] References Cited

U.S. PATENT DOCUMENTS

| 3,127,259 | 3/1964 | Boylan | 55/511 |
| 4,610,705 | 9/1986 | Sarnosky et al. | 55/DIG. 36 |
| 4,689,058 | 8/1987 | Vogt et al. | 55/511 |
| 4,690,701 | 9/1987 | Hedrick et al. | 55/DIG. 36 |

FOREIGN PATENT DOCUMENTS

| 0012293 | 4/1980 | Japan | 55/DIG. 36 |
| 0037434 | 4/1981 | Japan | 55/DIG. 36 |
| 0011692 | 3/1982 | Japan | 55/DIG. 36 |
| 2290213 | 11/1990 | Japan | 55/DIG. 36 |
| 406170140A | 6/1994 | Japan | 55/DIG. 36 |

*Primary Examiner*—Jay H. Woo
*Assistant Examiner*—Minh-Chau T. Pham
*Attorney, Agent, or Firm*—DAvid & Raymond; Raymond Y. Chan

[57] ABSTRACT

A novel soot filtering cap in a range hood includes a hood body, a soot absorbing perforated filter and a magnetic strip frame. A hook and loop fastener is provided on the peripheral rim of the vent cap of the hood body. The filter is made of fabric material having strong oil absorbability and strong gas penetrability and is fastened on the peripheral rim of the vent cap of the hood body. A plurality of vent holes are provided on the filter for smooth venting during operation of the range hood, while soot are completely absorbed by the filter. Furthermore, the plane area of the filter is larger than the cross section area of the vent cap and a protective edge is provided on the periphery of the filter. The magnetic strip frame is made of magnetic strip encased with rubber sheath and used to fasten the protective edge of the perforated filter onto the peripheral rim of the vent cap in a manner that facilitates the handling of the perforated filter and assures the positioning of the perforated filter on the peripheral rim of the vent cap.

1 Claim, 2 Drawing Sheets

SOOT FILTERING CAP IN A RANGE HOOD

BACKGROUND OF THE INVENTION

1. Field of the Invention

The invention relates to a novel soot filtering cap in a range hood, and particularly, to a structure of a soot filter which can be securely positioned on the peripheral rim of the vent cap of the range hood and which can be readily handled.

2. Description of the Prior Art

It is known that the conventional range hood vent soot by a blower and absorb soot generated during cooking with cellulosic filter. However, due to small area of the vent cap, soot can not be completely absorbed and hence the kitchen is still stained unavoidably. Moreover, the mounting and replacing of the cellulosic filter is a difficult task for ordinary housewives ( should be done with tools such as screw driver ). Furthermore, if the hood body of the range hood is stained by soot not absorbed instantly, the range hood must be disassembled and cleaned, and this sophisticated work should be done by professionals and special tools. While the range hood is disassembled and sent for cleaning, in order to keep the kitchen clean, housewives usually do not cook for several days which results in unconveniences to the family. In view of this, the inventor has studied and designed extensively in order to eliminate soot staining and facilitate replacing and cleaning, and as a result of many trials and improvements, the present invention is accomplished.

SUMMARY OF THE INVENTION

The main object of the invention is to provide a novel soot filtering cap in a range hood having a readily replacable perforated soot filter which can be securely fastened onto the peripheral rim of the vent cap of the range hood. The novel soot filtering cap in range hood of present invention is characterized that it comprises essentially a hood body, a soot absorbing perforated filter and a magnetic strip frame, wherein a hook and loop fastener such as a VELCRO (a registered trademark) tape is provided on the peripheral rim of the vent cap of the hood body; wherein said soot absorbing perforated filter is fastened on the rim of the vent cap through said hook and loop fastener and a plurality of vent holes are provided on the surface of said filter for smoothly venting during operation of the range hood while soot is completely absorbed by the filter so as to achieve an effect of removing soots, and, moreover, the plane area of the filter is larger than the cross section area of the vent cap such that a protective edge is formed on the periphery thereof; and wherein said magnetic strip frame is used to fasten said protective edge of the filter onto the peripheral rim of the vent cap of the hood body.

BRIEF DESCRIPTION OF DRAWINGS

The above-mentioned object and effectiveness of the present invention as well as technical means used therefor will be illustrated in detail by means of preferred embodiments thereof with reference to accompanied drawings in which.

DETAILED DESCRIPTION OF THE PREFERRED EMBODIMENTS

Figure 1:
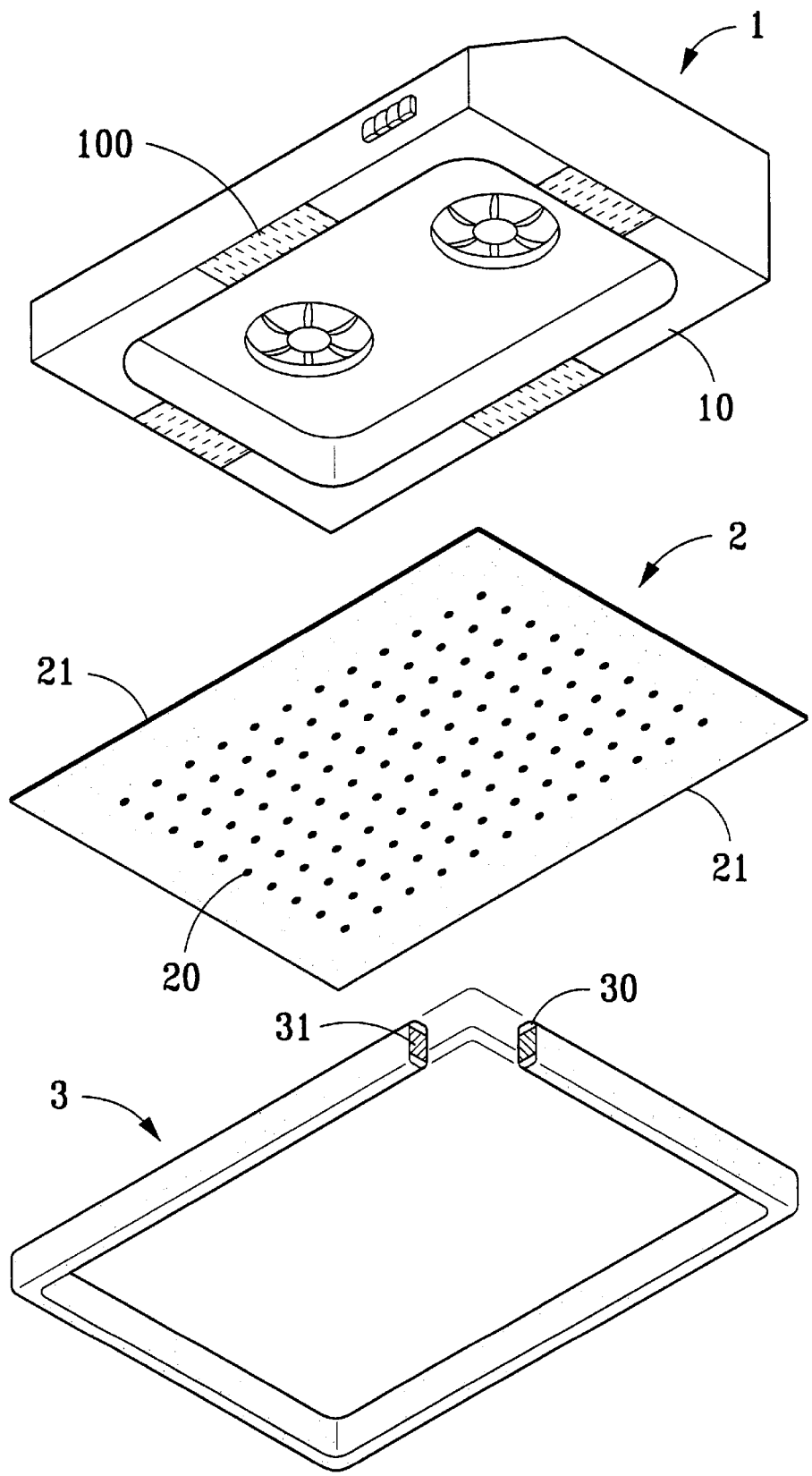
FIG. 1 shows the exploded schematic view of an embodiment of the novel soot filtering cap in a range hood according to the present invention.

Referring to FIG. 1, the novel soot filtering cap in a range hood of the present invention comprises a hood body 1, a soot absorbing perforated filter 2 and a magnetic strip frame 3. A plurality of hook and loop fasteners 100, such as VELCRO (a registered trademark) tapes, are provided on the peripheral rim of the vent cap 10 of the hood body 1. The soot absorbing perforated filter 2 is fastened onto the vent cap 10 of the hood body 1 by means of said hook and loop fastener 100 and is made of fabric material having strong oil absorbability and strong gas penetrability. A plurality of fine vent holes 20 are provided on the surface of said filter 2 for smoothly venting during operation of the range hood while soot is completely absorbed by the soot absorbing perforated filter 2 so as to achieve an effect of soot removal. The plane area of the soot absorbing perforated filter 2 is larger than the cross sectional area of the vent cap 10 of the hood body 1 so that a protective edge 21 is formed on the periphery thereof. The magnetic strip frame 3 is made of magnetic strip 31 encased with rubber shealth 30 and is used to stick the protective edge 21 of the soot absorbing perforated filter 2 onto the peripheral rim of the hood body 1.

Figure 2:
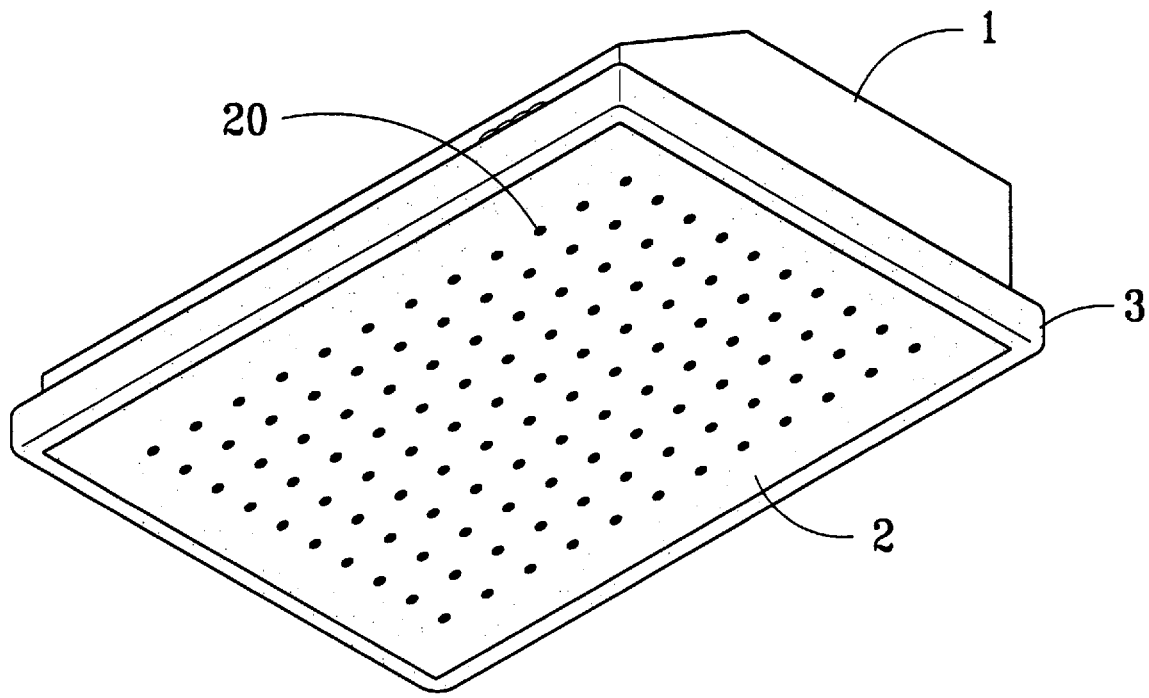
FIG. 2 shows the schematic view of an assembled embodiment of the novel soot filtering cap in a range hood according to the present invention.

In the assembling of the novel soot filtering cap in a range hood according to the invention, as shown in FIG. 1 and 2, the soot absorbing perforated filter 2 is first fastened on the peripheral rim 10 of the vent cap of the hood body 1 by means of the hook and loop fastener 100, and then the protective edge 21 of the soot absorbing perforated filter is folded upwardly so as to cover the peripheral rim 10 The magnetic strip frame 30 is fitly mounted upon an outer periphery of the protective edge 21 so that said soot absorbing perforated filter can not only be fastened on the peripheral rim 10 of the vent cap by means of said hook and loop fastener 100, but also be sticked and positioned magnetically beneath the hood body 1 through said magnetic strip frame 3 in order to prevent the soot absorbing perforated filter 2 from falling off due to heavily absorbing soot or due to reduction of bonding power between said filter 2 and the hook and loop fastener 100, while assure the fastening of said filter 2 on the peripheral rim 10 of the vent cap and facilitate soot absorption of said filter 2.

From the above description, it is apparent that the present invention comprises following advantageness:

1. Assembling and disassembling of constituent components are easy and cleaning thereof is convenient.

2. The soot absorbing perforated filter can be fastened more securely on the peripheral rim of the vent cap of the range hood.

3. Easy to keep the kitchen clean and always with fresh air, long life-period, not to contaminate the wall and totally environment protective as well as healthy to man.

Accordingly, it is understood that the present invention not only has achieved the intended objects and effectiveness, but also its practicability and convenience are the first ever seen. Moreover, many modifications and changes thereof will be apparent to those skilled in the art from reading the description hereinbefore, and it is intended to encompass those modifications and changes within the scope of the present invention which is defined by the appended claims.

What is claimed is:

1. A soot filtering cap for a range hood having a hood body, comprising
   a plurality of hook and loop fasteners provided on a peripheral rim of a vent cap of said hood body;
   a soot absorbing perforated filter which is made of fabric material having strong oil absorbability and strong gas penetrability and has a plurality of fine vent holes provided on a surface thereof for smoothly venting during operation of said range hood while soot is completely absorbed by said soot absorbing perforated filter so as to achieve an effect of soot removal, wherein said soot absorbing perforated filter has a plane area larger than a cross sectional area of said vent cap of said hood body and forms a protective edge on a periphery thereof, said soot absorbing perforated filter being fastened onto said vent cap of said hood body by means of said hook and loop fasteners and said protective edge of said soot absorbing perforated filter is folded upwardly to cover said peripheral rim of said vent cap of said hood body; and a magnetic strip frame, which is made of a magnetic strip encased with a rubber sheath, fitly mounted on an outer periphery of said protective edge for sticking said protective edge of said soot absorbing perforated filter onto said peripheral rim of said hood body, thereby said soot absorbing perforated filter not only is fastened on said peripheral rim of said vent cap by said hook and loop fasteners, but also is stuck and positioned magnetically beneath said hood body by said magnetic strip frame in order to prevent said soot absorbing perforated filter from falling off due to heavily absorbing soot and reduction of bonding power between said soot absorbing perforated filter and said hook and loop fasteners and to assure said soot absorbing perforated filter fastening on said peripheral rim of said vent cap and to facilitate soot absorption of said soot absorbing perforated filter.

\* \* \* \* \*